Figure 18:
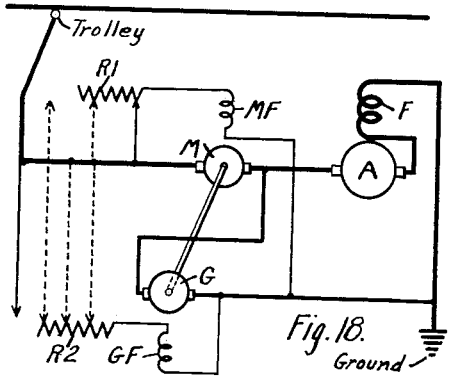

R. E. HELLMUND.
CONTROL SYSTEM.
APPLICATION FILED JUNE 19, 1915.
1,303,307.
Patented May 13, 1919.
7 SHEETS—SHEET 1.
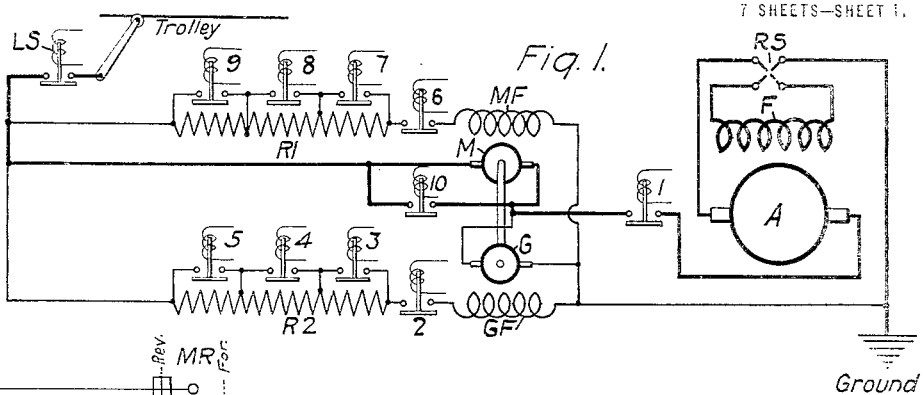
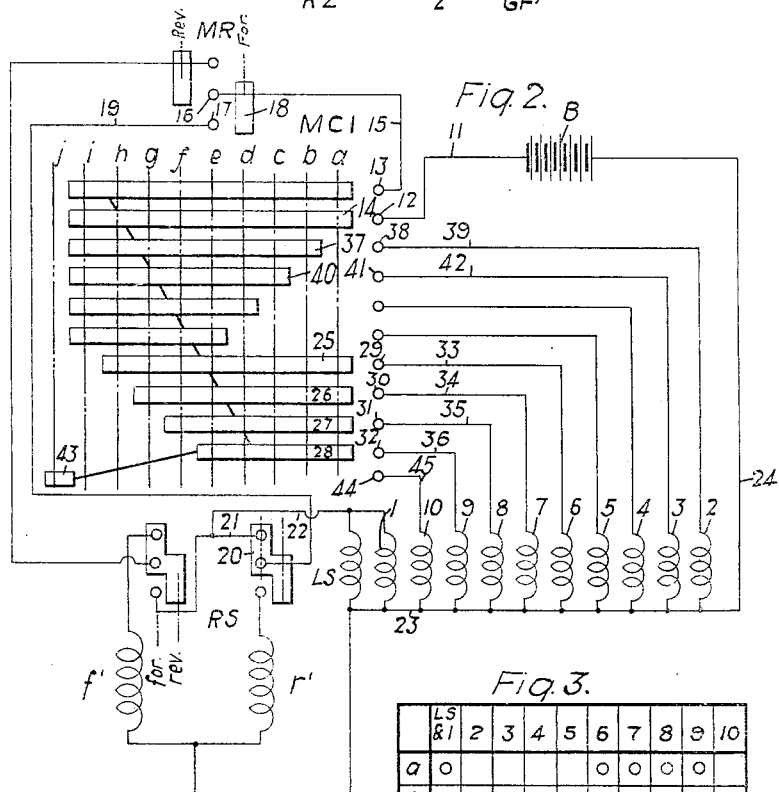
WITNESSES:
R. J. Cridge.
W. R. Coley
INVENTOR
Rudolf E. Hellmund.
BY
Wesley G. Carr
ATTORNEY

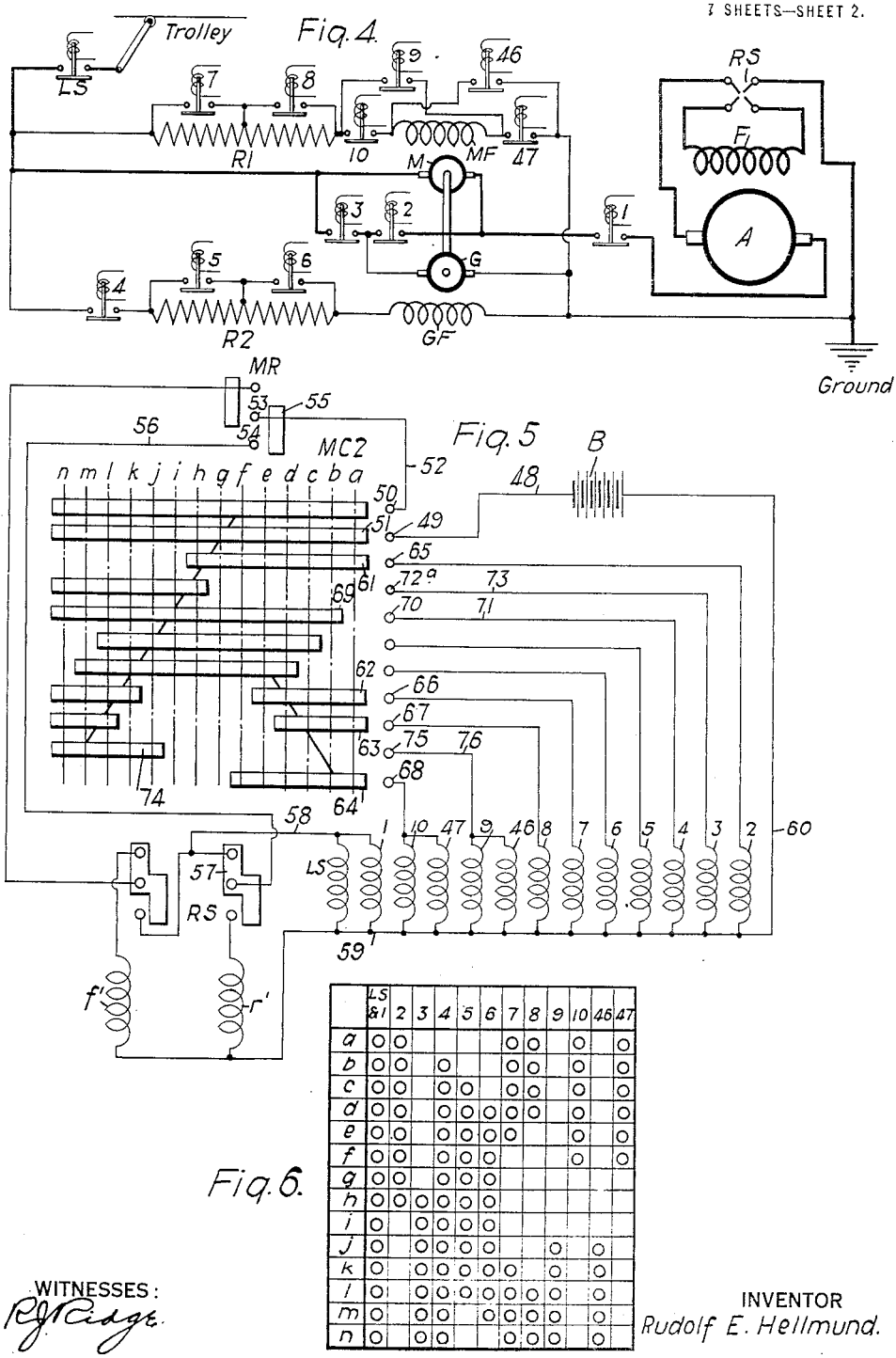

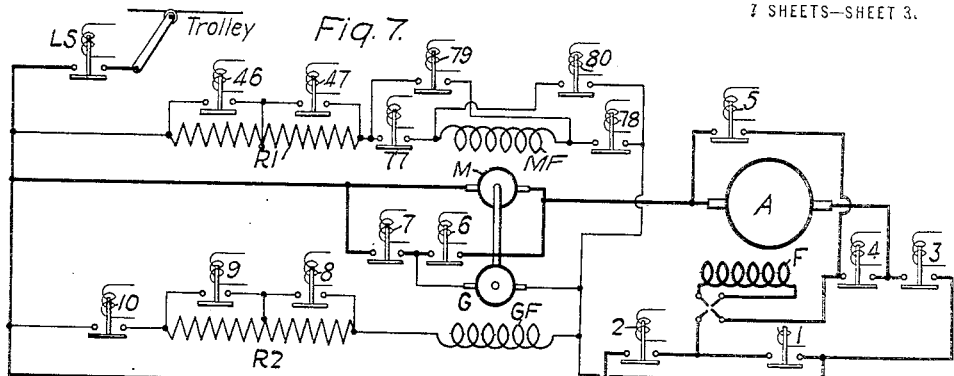
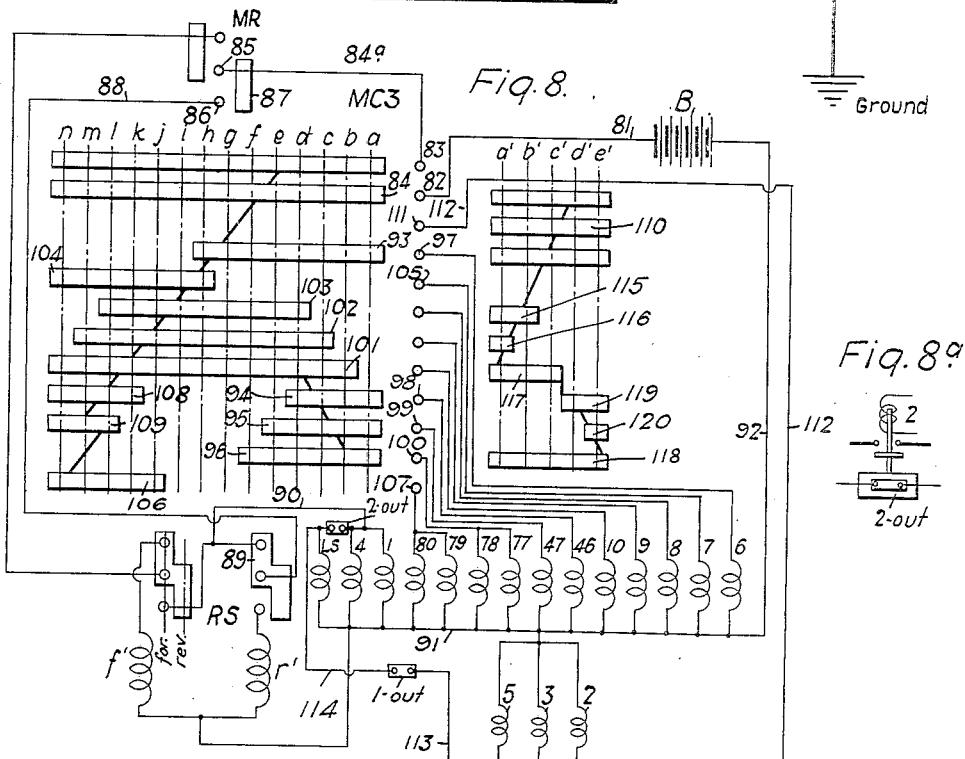

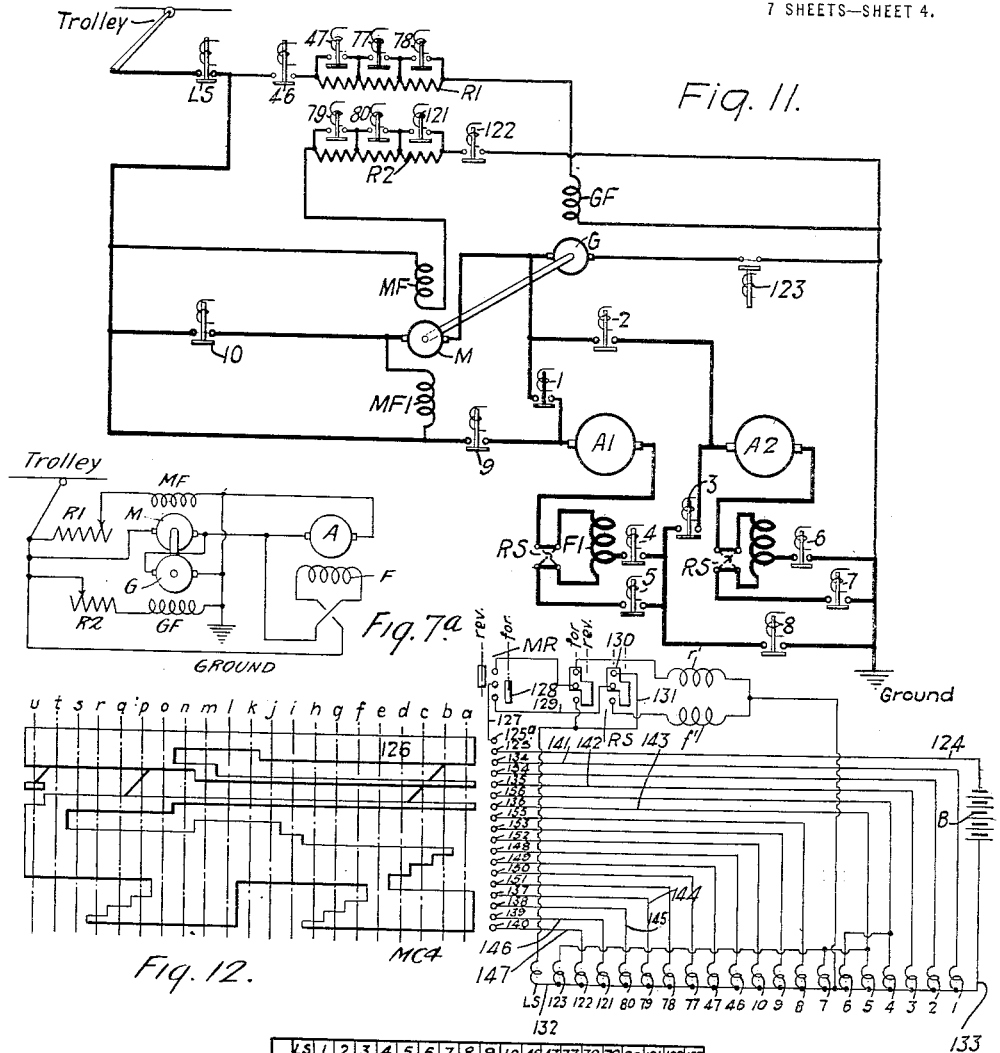

R. E. HELLMUND.
CONTROL SYSTEM.
APPLICATION FILED JUNE 19, 1915.
1,303,307.
Patented May 13, 1919.
7 SHEETS—SHEET 5.
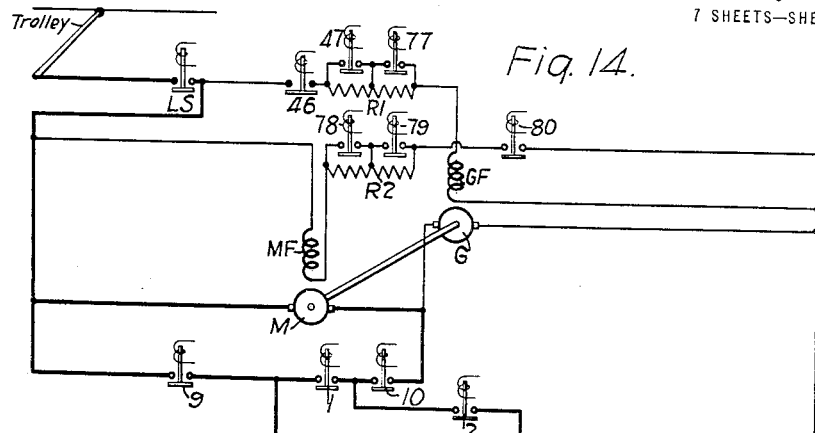
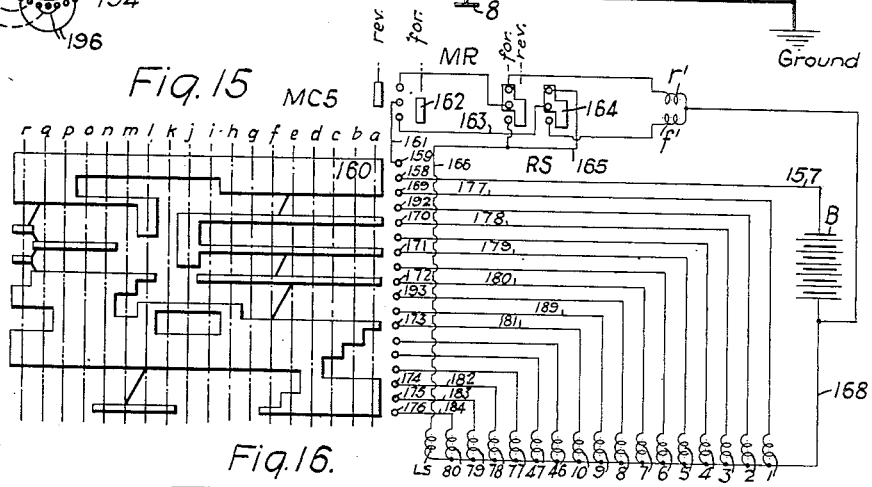
INVENTOR
Rudolf E. Hellmund.
WITNESSES:
BY
ATTORNEY

R. E. HELLMUND.
CONTROL SYSTEM.
APPLICATION FILED JUNE 19, 1915.

1,303,307.

Patented May 13, 1919.

WITNESSES:
Ed. V. Herron
W. R. Coley

INVENTOR
Rudolf E. Hellmund
BY
Wesley G. Carr
ATTORNEY

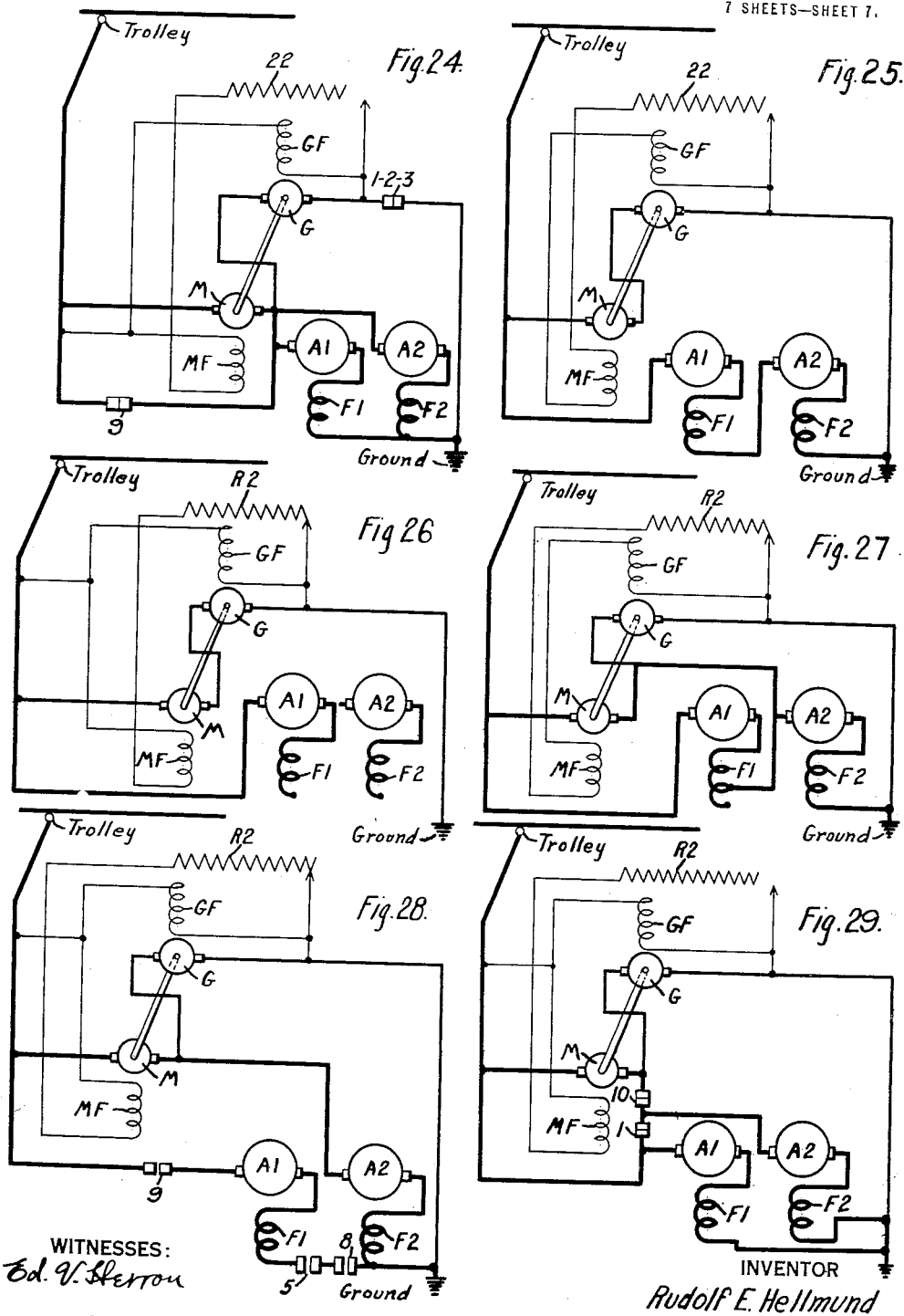

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,303,307.  Specification of Letters Patent.  Patented May 13, 1919.

Application filed June 19, 1915. Serial No. 35,166.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Control Systems, of which the following is a specification.

My invention relates to systems of control and it has special reference to the starting of electric railway vehicle motors and the like.

The object of my invention is to provide a system of the above-indicated character which shall be relatively compact and inexpensive in construction and efficient and reliable in operation.

More specifically stated, it is the object of my invention to provide a system for effecting acceleration of electric motors by means of a motor-generator set of relatively small capacity, whereby the energy losses during acceleration are reduced to a minimum.

Heretofore, it has been common practice for systems of the type under consideration to embody a plurality of accelerating resistors, thus wasting a certain amount of energy whenever the motors were started. In another less prevalent type of system, the motors of auxiliary motor-generator sets have been connected in the main circuit as "negative booster" machines to permit of a gradual increase of the voltage applied to the propelling motors as the voltages of the motors of the sets were decreased. To return a portion of the accelerating energy to the supply circuit, a generator driven by the motor of the set has customarily been employed. The latter method is materially more efficient than the resistor type of acceleration, but has the disadvantage of requiring machines of relatively large capacity, inasmuch as at the instant of starting, in particular, the negative booster has impressed upon it substantially full supply-circuit voltage and carries the heavy starting current, and, moreover, the main motor current traverses the motor of the set at all times during acceleration.

According to my present invention, I provide a system embodying a motor-generator set which is connected in circuit to effect efficient acceleration of the main motors and which is, however, of relatively small necessary capacity, as hereinafter more fully set forth.

Figure 19:
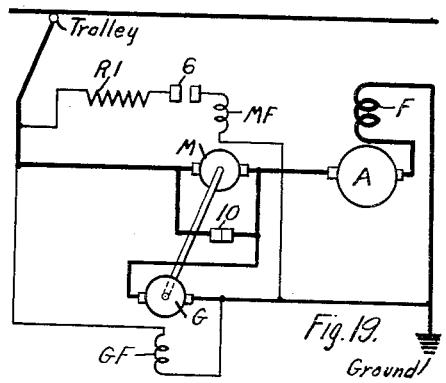
Figure 20:
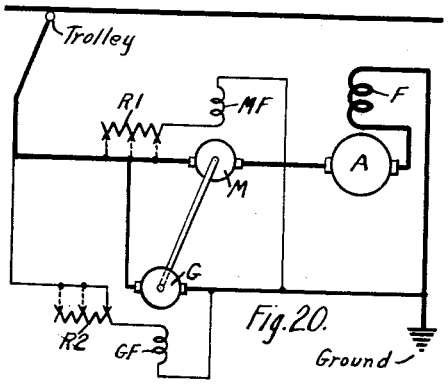
Figure 21:
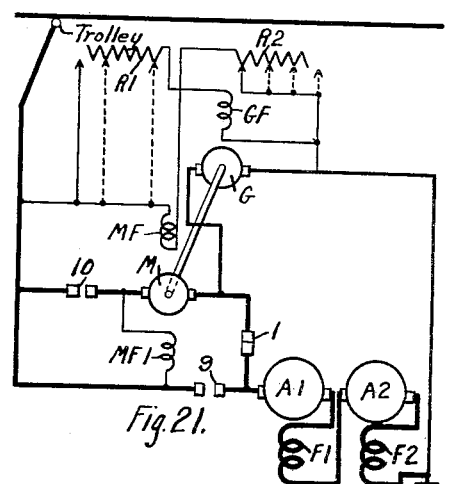
Figure 22:
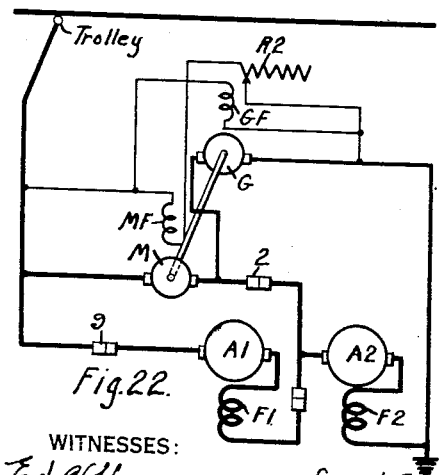
Figure 23:
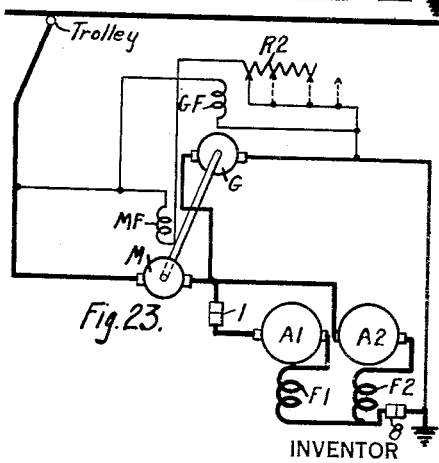

In the accompanying drawing, Figure 1 is a diagrammatic view of the main circuits of a system of control embodying my invention; Fig. 2 is a diagrammatic view of the auxiliary governing circuits for the system shown in Fig. 1; Fig. 3 is a sequence chart of well-known form for indicating the sequence of operation of the various controlling switches; Figs. 4, 5 and 6, 7, 8 and 9, 11, 12 and 13, and 14, 15 and 16 are views that correspond to Figs. 1, 2 and 3, respectively, and diagrammatically illustrate various modifications of my invention; Fig. 7ª is a simplified diagrammatic view corresponding to Fig. 7; Fig. 8ª is a detail diagrammatic view of a switch that is employed in my system; Fig. 10 is a sequence chart indicating the regenerative operation of the system illustrated in Fig. 7; Fig. 17 is a diagrammatic view of the preferred field winding construction of the machines comprising the motor-generator set that is embodied in my invention; and Fig. 18 to Fig. 29, inclusive, are simplified diagrammatic views of the principal main-circuit connections for the several illustrated systems.

Referring to Fig. 1 of the drawing, the system here shown comprises a plurality of suitable supply-circuit conductors respectively marked "Trolley" and "Ground"; a main or propelling motor that is provided with an armature A and a series field-magnet winding F; a reversing switch RS, preferably of a familiar electromagnetically-controlled drum type; a motor-generator set comprising a motor having an armature M and a corresponding field magnet winding MF, and a generator having an armature G and a corresponding field magnet winding GF; a plurality of controlling switches LS, 1, 2, 6 and 10; a suitable resistor for the circuit of the field winding MF that is adapted to be short-circuited in sections by switches 7, 8 and 9; and a second resistor R2 that is connected in circuit with the field winding GF and is adapted to be short-circuited in section by a plurality of switches 3, 4 and 5.

It will be noted that the armature G of the motor-generator set is connected in parallel-circuit relation to the main motor, while the armature M is connected in series-circuit relation therewith and with the armature G across the supply-circuit. The field windings of the motor-generator set are respectively disposed in series circuit with the resistors R1 and R2 across the supply circuit.

Referring now to Fig. 2, the auxiliary governing system shown comprises the actuating coils of the various controlling switches and of the reversing switch RS; a suitable source of energy for the coils, such as a battery B; a master controller MC1 that is adapted to occupy a plurality of operative positions $a$ to $j$, inclusive; and a master reverser MR that is adapted to occupy a forward and a reverse position for effecting the corresponding operation of the main reversing switch RS, in accordance with familiar practice.

Assuming that the reversing switch RS and the master reverser MR occupy their respective forward positions and that the master controller MC1 is actuated to its initial operative position $a$, the operation of the system may be set forth as follows: a circuit is first established from one terminal of the battery B through conductor 11, control fingers 12 and 13 which are bridged by contact segment 14 of the master controller, conductor 15, control fingers 16 and 17 which are bridged by contact segment 18 of the master reverser, conductor 19, contact segment 20 of the reversing switch RS, conductors 21 and 22, the parallel-connected actuating coils of the switches LS and 1, and conductors 23 and 24, to the opposite terminal of the battery B.

Other circuits are simultaneously established by reason of the engagement of contact segments 25, 26, 27 and 28 of the master controller with corresponding control fingers 29, 30, 31 and 32, from which points circuits are respectively completed through conductors 33, 34, 35 and 36 to the actuating coils of the switches 6, 7, 8 and 9.

The propelling motor is thus started into operation, and the armature M of the motor-generator set absorbs substantially all of the supply-circuit voltage for an instant, with a relatively light current, while the voltage of the armature G is relatively low, by reason of the fact that the field winding GF is totally deënergized, although the armature G supplies practically all of the main motor current. Inasmuch as the switches 7, 8 and 9 are closed, the armature M rotates in a relatively strong field, and the current taken from the supply circuit is just sufficient to suitably operate the main motor and to overcome the losses of the motor-generator set. The circuit connections at this stage are shown in a simplified manner in Fig. 18.

When the master controller MC1 is moved to its second position $b$, and energized contact segment 37 engages control finger 38, whence circuit is completed through conductor 39 and the actuating coil of the switch 2 to the negative conductor 24. The field winding GF is thus weakly energized, whereby the armature G begins to carry a smaller portion of the main motor load, while the current traversing the armature M is somewhat increased.

Upon movement of the master controller to its third operative position $c$, contact segment 40 engages control finger 41, whence circuit is completed through conductor 42 to the actuating coil of the switch 3, thereby increasing the energization of the field winding GF to a predetermined degree and causing GF to a predetermined degree and cause the armature G to assume a still smaller proportion of the main motor load.

When the master controller is actuated to its positions $d$ and $e$, the switches 4 and 5 are, respectively, closed in a similar manner, whereby the energization of the field winding GF is further gradually increased.

Upon the actuation of the master controller to its position $f$, contact segment 28 disengages control finger 32, thus opening the switch 9 and weakening the energization of the field winding MF to transfer a further portion of the supply-circuit voltage that is carried by the armature M to the main armature A and to the armature G.

In positions $g$, $h$ and $i$ of the master controller, the switches 8, 7 and 6 are respectively opened, thus gradually decreasing to zero the excitation of the field winding MF. When the switch 6 has been opened, the voltage of the armature M is substantially zero, although, for a short time, the armature, being in series circuit with the main armature, carries substantially the full-load current of the main motor. However, in position $j$ of the master controller, a contact segment 43 engages control finger 44, whence circuit is completed through circuit 45 and the actuating coil of the switch 10, thereby effecting the short-circuit of the armature M and excluding it from the main motor circuit before the traversal of the full main motor current, just referred to, has had time to injuriously heat up the armature M. Moreover, the main motor current at this time is of course materially less than the initial starting current. See Fig. 19.

It will be seen that the propelling motor is thus gradually accelerated, first by having substantially the full supply-circuit voltage impressed upon the armature M of the motor-generator set, while the voltage of the armature G is substantially zero; the voltage impressed upon the armature G is increased and, consequently, the proportion of the main motor load that the armature assumes, is then gradually decreased, and the proportion of the motor voltage that the armature M consumes is next gradually decreased until the voltage of the armature M is substantially zero, while the voltage of the armature G, which is connected across the main motor is substantially equal to supply-circuit voltage. In this way, each armature of the motor-generator set carries, on the average, about 50% of the accelerating current of the main motor, and the necessary capacity of the set is consequently reduced in proportion, as compared with the prior practice hereinbefore mentioned.

It should be observed that, in case two propelling motors are employed in connection with the system just described and are permanently connected in parallel-circuit relation, the average current carried by each machine of the motor-generator set approximates the current carried by each of the propelling motors and, consequently, the necessary capacity of the motor-generator set substantially equals the capacity of one of the propelling motors, or, in other words, about half of the capacity of the total propelling-motor power upon the vehicle.

As a modification of the system described, the acceleration of the main motor or motors may be carried further by reversing the operation of one of the machines of the motor-generator set and impressing a voltage higher than the supply-circuit voltage upon the main motor. Such a system is illustrated in Figs. 4 and 5.

Referring to Fig. 4, the system shown comprises the supply-circuit, the main motor, the motor-generator set and the field-circuit resistors R1 and R2, as already described in connection with the system illustrated in Fig. 1, and, in addition, the field-magnet winding MF of the motor-generator set is provided with a plurality of reversing switches 9, 10, 46 and 47, the switches 10 and 47 corresponding to the operation of the armature M that has already been described in connection with Fig. 1 and the switches 9 and 46 serving to reverse the excitation of the field winding MF and, consequently, effect the above-mentioned further acceleration of the main motor.

The auxiliary governing system of Fig. 5 comprises the actuating coils of the various switches that are shown in Fig. 4, the battery B, the master reverser MR, and a master controller MC2 that is adapted to occupy a plurality of operative positions $a$ to $n$, inclusive.

Assuming that the reversing switch RS and the master reverser MR occupy their respective forward positions and that the master controller MC2 is actuated to its initial operative position $a$, the operation of the system may be described as follows: A circuit is first completed from one terminal of the battery B through conductor 48, control fingers 49 and 50, which are bridged by contact segment 51 of the master controller, conductor 52, control fingers 53 and 54, which are bridged by contact segment 55 of the master reverser, conductor 56, contact segment 57 of the reversing switch RS, conductor 58, the parallel-connected actuating coils of the switches LS and 1, and conductors 59 and 60, to the opposite terminal of the battery B.

Other circuits are simultaneously established by reason of the engagement of contact segments 61, 62, 63 and 64 with control fingers 65, 66, 67 and 68, respectively, of the master controller, from which points circuits are completed to the actuating coils of the switches 2, 7, 8, 10 and 47.

The main motor is thus started into operation, with the armature M of the motor-generator set for an instant, absorbing substantially all of the supply-circuit voltage, while the armature G operates at a relatively low voltage by reason of the deënergization of its field-magnet winding GF. Substantially all of the accelerating current is initially carried by the armature G, as hereinbefore pointed out. See Fig. 18.

When the master controller is moved to its position $b$, an energized contact segment 69 engages control finger 70, whence circuit is completed through conductor 71 and the actuating coil of the switch 4, thereby effecting a predetermined relatively weak energization of the field winding GF.

In the subsequent positions $c$ to $g$, inclusive, of the master controller, the switches 5 and 6 are closed to strengthen the excitation of the field winding GF and the switches 8, 7 and 10 and 47 are successively opened to gradually weaken the energization of the field winding MF, whereby the main motor is accelerated in a manner similar to that already set forth in connection with the system that is illustrated in Fig. 1.

In position $h$ of the master controller, a contact segment 72 engages control finger 72$^a$, whence circuit is completed through conductor 73 to the actuating coil of the switch 3, thereby short-circuiting the armature M after its field winding MF has been totally deënergized. See Fig. 19.

In position $i$ of the master controller, contact segment 61 disengages the control finger 65, whereby the switch 2 is opened and, since the switch 3 has already been closed, the armature G is connected directly across the supply circuit. See Fig. 20.

Further acceleration of the main motor is then effected when the master controller is moved to its position $j$ by reason of the establishment of a circuit from contact segment 74, through control finger 75 and conductor 76 to the parallel-connected actuating coils of the switches 9 and 46, thus, reversing the excitation of the field winding MF, and, consequently, the boosting action of the armature M of the motor-generator set.

It is necessary to reverse the manner of energization of the field windings MF and GF of the motor-generator set to effect the desired increase in acceleration of the main motor and, therefore, in position $k$ of the master controller the switch 7 is closed to increase the excitation of the field winding MF to a predetermined degree and in position $l$ of the master controller the switch 8 is closed to connect the field winding MF directly across the supply circuit. In positions $m$ and $n$ of the master controller, the switches 5 and 6 are respectively opened, thereby gradually weakening the excitation of the field winding GF.

The system just described therefore effects the acceleration of the main motor or motors initially, in a manner similar to that illustrated in connection with Fig. 1, and, subsequently, the action of the motor-generator set is reversed by reversing the connections of the field winding MF, whereby the main motor or motors may be accelerated to a further degree by thus impressing upon them a voltage that is higher than the supply-circuit voltage.

In the system that is illustrated in Figs. 7 and 8, my invention is adapted to be employed in connection with both the acceleration and the regenerative operation of the main motor or motors.

The system of Fig. 7 comprises the main motor having the armature A and the field-magnet winding F, the motor-generator set having the armatures M and G and the corresponding field-magnet windings MF and GF, the field-circuit resistors R1 and R2 and a plurality of controlling switches for effecting the acceleration of the main motor in a manner similar to that described in connection with the system that is shown in Fig. 4, such operation being indicated by the sequence chart of Fig. 9, and another combination of the switches being adapted to effect regenerative operation of the main motors, as indicated in the sequence chart of Fig. 10.

The auxiliary governing system shown in Fig. 8 comprises the actuating coils for the various switches that are shown in Fig. 7, the battery B, the master reverser MR, and a master controller MC3 that is adapted to occupy a plurality of operative positions $a$ to $n$, inclusive, when operated in one direction that corresponds to the acceleration of the main motors and is adapted to occupy a plurality of operative positions $a'$ to $e'$, inclusive, when the master controller is actuated in the opposite direction to effect regenerative operation of the main motors.

Assuming that the reversing switch RS and the master reverser MR occupy their respective forward positions and that the master controller MC3 is actuated to its initial position $a$, the operation of the system may be set forth as follows: A circuit is first established from one terminal of the battery B through conductor 81, control fingers 82 and 83, which are bridged by contact segment 84 of the master controller, conductor 84$^a$, control fingers 85 and 86, which are bridged by contact segment 87 of the master reverser, conductor 88, contact segment 89 of the reversing switch RS, conductor 90, interlock 2—out, the actuating coil of the switch LS, and conductors 91 and 92, to the negative terminal of the battery B. The actuating coils of the switches 1 and 4 are also simultaneously energized by reason of their permanent connection between conductors 90 and 91. The interlock 2—out is adapted to close the circuit of the actuating coil of the switch LS when the switch 2 occupies its open position, as diagrammatically illustrated in Fig. 8$^a$ and in accordance with a familiar practice.

Other circuits are simultaneously established from contact segments 93 and 94, 95 and 96 of the master controller through control fingers 97, 98, 99 and 100, respectively, to the actuating coils of the switches 6, 46, 47, and the parallel-connected actuating coils of the switches 77 and 78.

The arrangement of connections is similar to that initially employed in connection with the system of Fig. 4, already described, the closure of the switches 77 and 78 corresponding to the initial negative booster or motor action of the armature M of the motor-generator set. See Fig. 18.

In positions $b$, $c$ and $d$ of the master controller, contact segments 101, 102 and 103 respectively engage corresponding control fingers, whereby the actuating coils of the switches 10, 9 and 8 are respectively energized to gradually increase the excitation of the field winding GF from zero to a predetermined maximum value, to correspondingly increase the voltage of the generating armature G.

In positions $e$ and $f$ of the master controller, switches 46 and 47 are respectively opened, and, in position $g$ thereof, the switches 77 and 78 are opened, thereby gradually decreasing the excitation of the field winding MF and thus reducing the voltage of the armature M of the motor-generator set to substantially zero, in a manner similar to that already described in connection with the other systems. In position $h$ of the master controller, the switch 7 is closed to short-circuit the armature M, (see Fig. 19), and, in position $i$, the switch 6 is opened, the operation of these two switches corresponding to the operation of the switches 3 and 2, respectively, in the system that is illustrated in Fig. 4. In position $j$ of the master controller, a circuit is completed from contact segment 106, through control finger 107 and the parallel-connected actuating coils of the switches 79 and 80, whereby the reversal in the excitation of the field winding MF is effected. See Fig. 20.

In positions $k$ and $l$ of the master controller, the switches 46 and 47 are respectively closed to gradually strengthen the excitation of the field-magnet winding MF, whereby the positive booster or generator action of the armature M is increased, and, in positions m and n of the master controller, the switches 8 and 9 are opened to effect a decrease in the excitation of the field winding GF and a corresponding reduction in the proportion of the main motor current that traverses the armature G, which now acts as a driving machine for the motor-generator set.

Assuming that the speed of the motor or motors is suitable for regenerative operation, the master controller MC3 may be returned toward its off position and then actuated to its initial regenerative position $a'$. A circuit is first established from one terminal of the battery B, through conductor 81, and control fingers 82 and 97 which are bridged by contact segment 110, whence cirsuit is completed through the actuating coil of the switch 6 to the negative conductor 92. Another circuit is simultaneously established from the contact segment 110, through control finger 111, conductor 112 and the actuating coils of the switches 2, 3 and 5 to conductor 91. Another circuit is completed from conductor 112, through conductor 113, interlock 1—out, conductor 114 and the actuating coil of the switch LS. Still further circuits are established from contact segments 115, 116 and 117 of the master controller through corresponding control fingers to the actuating coils of the switches 8, 9 and 10. Finally, a circuit is established from contact segment 118 through control finger 100 to the actuating coils of the switches 77 and 78.

The closure of the switches 2 and 5 serves to connect the field winding F of the main motor in parallel-circuit relation to the armature M of the motor-generator set to receive current in the reversed direction from the accelerating current, in accordance with a familiar principle, and the closure of the switches 3 and 6 serves to dispose the armature A of the main motor in similar relation to the armature G of the motor-generator set. The field winding GF is fully energized by reason of the closure of the switches 8, 9 and 10, and the field winding MF is energized in the reversed direction to that in force when the main motor was running at full speed at the end of the accelerating period. The simplified circuit connections are shown in Fig. 7ª.

Upon movement of the master controller to its position $b'$, the contact segment 116 becomes disengaged from the corresponding control finger, whereby the switch 9 is opened to effect a predetermined weakening of the energization of the field winding GF, and, in position $c'$, the switch 8 is opened to effect further decrease of the excitation of the field winding GF. In positions $d'$ and $e'$, contact segments 119 and 120 of the master controller respectively engage control fingers 98 and 99, whereby the switches 46 and 47 are successively closed to gradually strengthen the energization of the field winding MF of the motor-generator set.

The voltage of the armature G that is connected across the main armature A, to serve as a driving motor for the motor-generator set, is thus gradually decreased, while the voltage of the armature M that is connected across the main field winding F, to serve as an exciter therefor, is increased to suitably strengthen the field excitation of the main motor or motors as their speed decreases during regeneration.

I have found that, by employing seriesparallel control of a plurality of electric motors, in connection with the motor generator set, as illustrated in Fig. 11, the necessary capacity of the set may be still further reduced. Moreover, by utilizing the familiar "field control" of the main series motors, the proportion of the accelerating period during which the motor-generator set is employed is still further reduced, with a consequent decrease in the necessary operating capacity of the set.

Referring to Fig. 11, the system shown comprises supply-circuit conductors Trolley and Ground; a plurality of propelling electric motors, respectively having armatures A1 and A2 and corresponding subdivided field windings F1 and F2; the main-circuit reversing switch RS for simultaneously reversing the electrical relations of the corresponding armatures and field windings; the motor-generator set having the armatures M and G and the shunt-connected field magnet windings MF and GF, the armature M being shown as provided with an additional series-connected field magnet winding MF1; and a plurality of actuating switches, as indicated in the sequence chart of Fig. 13, for suitably controlling the operation of the main motors and of the motor-generator set, in the manner to be described.

The auxiliary governing system that is shown in Fig. 12 comprises the necessary actuating coils for the various switches that are illustrated in Fig. 11; the battery B, the master reverser MR, and a master controller MC4 that is adapted to occupy a plurality of operative positions $a$ to $u$, inclusive.

Assuming that the reversing switch RS and the master reverser MR occupy their respective forward positions and that the master controller MC4 is actuated to its initial position $a$, the operation of the system may be described as follows: A circuit is first established from one terminal of the battery B, through conductor 124, control fingers 125 and 125ª, which are bridged by the contact segment 126 of the master controller, conductor 127, contact segment 128 of the master reverser, conductor 129, contact segment 130 of the reversing switch RS, conductor 131, the actuating coils of the switch LS and conductors 132 and 133, to the opposite terminal of the battery B.

Other circuits are simultaneously established from the contact segment 126 through control fingers 134 to 140, inclusive, and conductors 141 to 147, inclusive, to the actuating coils of the switches 1, 3, 5, 7, 79, 80, 121, 122 and 123, respectively.

The motors are thus started into operation, with the armature M of the motor-generator set for an instant carrying substantially the full supply-circuit voltage, while the armature G of the set operates at a relatively low voltage, by reason of the deënergization of its field magnet winding GF, as hereinbefore pointed out. See Fig. 21.

In positions b, c, d and e of the master controller, the contact segment 126 engages control fingers 148, 149, 150 and 151, respectively, whereby the switches 46, 47, 77 and 78 are closed to effect the gradual strengthening of the field current traversing the field magnet winding GF, and, in positions f, g, h and i of the controller, the switches 79, 80, 121, and 122 are respectively opened by reason of the disengagement of the contact segment 126 from the corresponding control fingers, whereby the voltage of the armature M of the motor generator set is gradually reduced to substantially zero, as in the system already described.

In position i of the controller, another circuit is established from contact segment 126, through control finger 152 to the actuating coil of the switch 10, whereby the series-connected field magnet winding MF1 of the motor-generator set is short-circuited.

When the master controller is moved to its position j, the contact segment 126 engages control finger 153, whence circuit is completed through the actuating coil of the switch 9, thereby short-circuiting the armature M of the motor-generator set in a similar manner to that already described. Note Fig. 21.

In position k of the master controller, the switch 1 is opened by reason of the disengagement of contact segment 126 and the control finger 134, whereby the main motors are connected in full-series relation across the supply circuit.

In position l, the contact segment 126 again engages control fingers 137, 138, 139, and 140, whereby the switches 79, 80, 121, and 122 are closed to effect full excitation of the field winding MF of the motor-generator set. When the master controller is moved to position m, the contact segment 126 engages control finger 154, whence circuit is completed through the actuating coil of the switch 2, whereby the voltage of the armature A2, which is thus connected in parallel relation with the armature G of the motor-generator set, is increased to a predetermined value somewhat above one-half of the supply-circuit voltage. See Fig. 22.

In position n of the master controller, switches 3 and 9 are opened by reason of the disengagement of the contact segment 126 from the corresponding control fingers, and the motor having the armature A1 is thus temporarily excluded from circuit. However, in the succeeding position o of the controller, switch 1 is closed in the manner already described and switch 8 is closed by reason of the engagement of contact segment 126 with control finger 155. The previously disconnected motor is thus disposed in parallel-circuit relation with the motor, having the armature A2, which has been included in circuit throughout. Note Fig. 23. It will be observed that, at this period of the main motor acceleration, the motor-generator set supplies the entire accelerating current for a short time, but, under the existing voltage conditions, approximately one half this current will be supplied by the armature M and one half by the armature G of the motor-generator set.

In positions p, q, r and s of the master controller, the switches 79, 80, 121 and 122 are respectively opened, in a manner similar to that already described, to gradually reduce the voltage of the armature M to zero.

In position t, the switch 9 is again closed, whereby the main motors are connected in mutual parallel-circuit relation to the armature G across the supply circuit, the armature M of the motor-generator set being again short-circuited. See Fig. 24.

When the master controller is moved to its final operative position u, the contact segment 126 engages control finger 156, whence circuits are completed through the parallel-connected actuating coils of the switches 4 and 6, and, simultaneously, the switches 5 and 7 are opened by reason of the disengagement of the contact segment 126 from the corresponding control fingers, whereby perdetermined portions of each of the main field windings F1 and F2 are excluded from the main circuits to effect a further step in the acceleration of the main motors, in accordance with a familiar practice.

It will be observed that, in the system just described, the maximum current traversing the armature G of the motor-generator set does not exceed approximately one half of the total main motor current at any time, or, in other words, is never more than one half as much as the current that would be required if the main propelling motors were permanently connected in parallel relation, as mentioned in connection with the system shown in Fig. 1.

A further modification of the system that is illustrated in Fig. 11 is shown in Fig. 14, whereby a still smaller necessary capacity of the motor-generator set obtains. One of the chief features of the system comprises the relation between the currents employed in the main field windings and the voltages impressed upon the main motors during the transition from series to parallel connection thereof. The field-magnet windings of the main motors are adapted for "field control" and are designed to consume approximately the same amount of current with the "short" field connections, when a predetermined voltage that corresponds to approximately one half of the supply-circuit voltage is impressed upon the motors, as the field windings consume with the "full"-field connections when approximately the full supply-circuit voltage is impressed upon them. The purpose of this design of parts will appear from the operation of the system, as hereinafter described.

The system shown in Fig. 14 is similar to that illustrated in Fig. 11, the only differences being the omission of switch 123 and the use of two switches instead of three to short-circuit the various sections of the field-circuit resistors R1 and R2.

The auxiliary governing system of Fig. 15 is of the usual type, comprising the actuating coils for the various switches that are illustrated in Fig. 14, the battery B, the master reverser MR, and a master controller MC5 that is adapted to occupy a plurality of operative positions $a$ to $r$, inclusive.

Assuming that the reversing switch RS and the master reverser MR occupy their respective forward positions and that the master controller MC5 is actuated to its initial position $a$, the operation of the system may be set forth as follows: A circuit is first established from one terminal of the battery B, through conductor 157, control fingers 158 and 159, which are bridged by contact segment 160 of the master controller, conductor 161, contact segment 162 of the master reverser, conductor 163, contact segment 164 of the reversing switch RS, conductors 165 and 166, the actuating coil of the switch LS and conductors 167 and 168, to the opposite terminal of the battery B.

Other circuits are simultaneously established from the contact segment 160, through control fingers 169 to 176, inclusive, and conductors 177 to 184, inclusive, to the actuating coils of the switches 1, 3, 5, 7, 10, 78, 79 and 80, respectively.

The operation of the system under consideration, until the transition of the motors from series to parallel relation, is very similar to that described in connection with the system of Fig. 11. In positions $b$, $c$ and $d$ of the master controller, switches 46, 47 and 77 are closed to gradually strengthen the energization of the field winding GF of the motor-generator set and, in positions $e$, $f$ and $g$ of the controller, the switches 78, 79 and 80 are opened to gradually reduce the voltage upon the armature M of the motor-generator set to substantially zero. In position $h$, the switch 9 is closed to short-circuit the armature M of the motor-generator set in a manner similar to that described in connection with the other systems, whereby the series-connected main motors are disposed directly across the supply circuit.

In position $i$, the switches 1 and 10 are opened by reason of the disengagement of the contact segment 160 and the respectively corresponding control fingers 169 and 173, thus interrupting the parallel connection of the armature G with the armatures A1 and A2. See Fig. 25.

In position $j$, the switches 4 and 6 are closed, and the switches 5 and 7 are opened to effect the exclusion from circuit of portions of the field-magnet windings F1 and F2, as already described in connection with Fig. 11.

In position $k$ of the controller, switches 3, 4 and 6 are temporarily opened and switch 80 is again closed to produce a relatively small voltage in the armature M. See Fig. 26. In position $l$, switches 3, 4, 7, and 10 are closed and, in addition, switch 2 is closed by reason of the engagement of the contact segment 160 with the control finger 192.

The voltage of the armature G at this time has been increased to a predetermined relatively high value, namely, the difference between supply-circuit voltage and the above-mentioned relatively small voltage of the armature M, while the motor having the armature A2 has been re-connected for full-field energization and disposed across the armature G by reason of the closure of switches 2 and 10. The other main motor, with "short"-field connection, at this time has impressed upon it the relatively low voltage of the armature M, and thus temporarily carries a portion of the vehicle load. See Fig. 27.

In position $m$, switches 3, 4, and 9 are opened, and in position $n$, switches 5 and 9 are again closed and switch 8 is closed by reason of the engagement of the contact segment 160 with control finger 193, whence circuit is completed through the actuating coil of the switch 8. The motor having the armature A1 is thus entirely disconnected from the circuit and is then reconnected with the "full"-field winding in circuit across the supply circuit. Note Fig. 28. By reason of the novel relations of main field-winding circuits hereinbefore mentioned, the field-current conditions remain relatively steady during the transition period.

In position o, the switch 80 is opened, whereby the field winding MF of the motor-generator set is entirely deënergized, and, in position p, the switch 1 is again closed, thus short-circuiting the armature M. Consequently, the voltage of the armature G of the motor-generator set is increased to substantially the supply-circuit voltage, and the voltage impressed across the main motor having the armature A2 is similarly increased. See Fig. 29.

In position q, the switch 10 is opened, thereby disconnecting the armature G from the circuit of the main motors which are thus directly connected in full parallel relation across the supply circuit.

In the final position r of the master controller, switches 4 and 6 are closed and switches 5 and 7 are simultaneously opened, whereby the "short"-field connections of the main motors again obtain, as already described in connection with position 1.

In the system just described, the necessary capacity of the motor-generator set is relatively small, as compared with the necessary capacity of the sets employed in the other systems described, for the following reasons:

The maximum voltage on either the armature M or the armature G of the motor-generator set is the full supply-circuit voltage for short periods and the maximum current carried at any time by either armature is equal to approximately one half of the accelerating current that is taken by the pair of propelling motors. Consequently, the average voltage applied to either armature of the motor-generator set is approximately one half of the supply-circuit voltage, and the average current is about one quarter of the accelerating current, or, in other words, the output of each of the armatures M and G approximates one eighth of the accelerating current multiplied by the full supply-circuit voltage. When it is further considered that the accelerating period is only a relatively small percentage of the total running time of the main motors, it is evident that the necessary capacity of each of the machines comprising the motor-generator set need be approximately only 10% of the capacity of the set of main propelling motors.

Preferably, the two machines, comprising the motor-generator set that is employed in connection with the system hereinbefore described, are provided with a distributed compensating winding of a familiar type that is shown in Fig. 17, in order to render the two machines relatively free from "flash-over" trouble. For example, the machine M is diagrammatically illustrated in Fig. 17 as comprising a stator 194 and a rotor 195 coöperating therewith and provided with any suitable type of winding (not shown). The stator 194 is provided with a main or exciting field winding 196 that is distributed around the stator to produce a suitable number of magnetic poles and a distributed compensating winding 197 that has its turns partially disposed intermediate the various portions of the exciting field winding and partially interlacing with the turns of the exciting winding, in accordance with a familiar practice.

It will be understood that the motor-generator set that is employed in connection with any of the systems described may be utilized to drive an air-compressor, a blower for the main motors, or other auxiliary apparatus, if desired.

It will also be understood that any equivalent of the motor-generator sets I have described, such as the "dynamotor" type of machine which embodies two armature windings on one core and one or more field magnet windings within a single supporting frame, may be utilized, if desired, and may prove advantageous in some ways.

I do not wish to be restricted to the specific circuit connections or arrangement of parts herein set forth, inasmuch as various modifications thereof may be made without departing from the spirit and scope of my invention. I desire, therefore, that only such limitations shall be imposed as are indicated in the appended claims.

I claim as my invention:

1. In a system of control, the combination with a supply circuit and a plurality of main electric motors, of an auxiliary motor-generator set, means for connecting the armature of one of the machines of said set in parallel relation to said main motors connected in series relation, means for connecting the armature of the other machine in series relation with the main motors, means for effecting the excitation of the field windings of said machines, means associated with said field windings for varying the voltages of the respective machines from zero to a predetermined maximum value, and vice versa, whereby a gradual accelerating voltage is applied to the main motors until full supply-circuit voltage is reached, and means for subsequently strengthening the main-motor fields and for connecting the main motors in parallel relation across the supply circuit.

2. In a system of control, the combination with a supply circuit and a plurality of electric motors severally having subdivided field windings, of an auxiliary motor-generator set, means for initially connecting said motors in series relation across the armature of one of the machines of said set, means for variably exciting the field windings of said set to vary the voltages of the armatures thereof and the accelerating voltage impressed upon the motors, means for excluding portions of the motor field windings from circuit, and means for effecting direct transition of the motors to full parallel relation.

3. In a system of control, the combination with a supply circuit, and a plurality of electric motors severally having subdivided field windings adapted to permit the traversal of approximately equal currents under partial-field-winding conditions for a predetermined voltage and under full-field-winding conditions for substantially twice said predetermined voltage, of an auxiliary motor-generator set, means for initially connecting said motors in series relation across the armature of one of the machines of said set, means for variably exciting the field windings of said set to vary the voltages of the armatures thereof and the accelerating voltage impressed upon the motors, means for temporarily excluding portions of the motor field windings from circuit, means for connecting the first motor with full-field winding across said auxiliary armature, means for connecting another motor with full-field winding to the supply circuit, and means for subsequently connecting said first motor with full-field winding to the supply circuit.

4. The method of operating a plurality of electric motors in conjunction with an auxiliary motor-generator set which consists in connecting the armature of one of the machines of said set in parallel relation to said motors connected in series relation, varying the field excitation of the machines of said set to independently vary the voltages of the respective machines from zero to a predetermined maximum, and vice versa, whereby a gradual accelerating voltage is applied to the main motors until a given voltage is reached, and subsequently strengthening the main-motor field windings and connecting the main motors in parallel relation.

5. The method of operating a plurality of electric motors severally having subdivided field windings from a supply circuit in conjunction with an auxiliary motor-generator set which consists in initially connecting the motors with full-field windings in series relation across the armature of the first machine of said set, the second machine thereof being connected in series relation with the motors, increasing the voltage of said first machine and decreasing the voltage of said second machine to effect predetermined acceleration of the motors, temporarily excluding portions of the motor-field windings from circuit, connecting the first motor with full-field winding in parallel relation to said first machine armature under relatively high-voltage conditions thereof, connecting the other motor with full-field winding to the supply-circuit, and then connecting said first motor to the supply circuit.

6. The method of transition of a plurality of motors from series to parallel-circuit relation when operated from a supply circuit and in conjunction with an auxiliary source of energy which consists in varying the voltage of said source to a predetermined value, varying the active portion of the field winding of one of the motors, connecting that motor across said auxiliary source, varying the active portion of the field winding of another motor, connecting the last-named motor to the supply circuit, and then connecting the first-named motor directly to the supply circuit.

7. The method of transition of a plurality of motors from series-circuit relation with field windings partially active to parallel circuit relation when operated from a supply circuit and in conjunction with a motor-generator set which consists in increasing the voltage of the first machine of said set to a relatively high value, changing over the first motor to full-field conditions, connecting that motor to said first machine, changing over the second motor to full-field conditions, connecting said second motor to the supply circuit, increasing the voltage of the first motor to substantially supply-circuit voltage, and connecting said first motor directly to the supply circuit.

8. In a system of control, the combination with a supply circuit and a plurality of electric motors severally having sub-divided field windings, of means for effecting acceleration of said motors to full series relation, means for excluding portions of the motor field windings from circuit, and means for effecting direct transition of the motors to full parallel relation without varying the resistance value of the motor circuits.

9. In a system of control, the combination with a supply circuit, and a plurality of electric motors severally having subdivided field windings adapted to permit the traversal of approximately equal currents under partial-field-winding conditions for a predetermined voltage and under full-field-winding conditions for substantially twice said predetermined voltage, of means for effecting acceleration of said motors to full series relation, means for temporarily excluding portions of the motor field windings from circuit, means for directly connecting one motor with full-field winding to the supply circuit, and means for subsequently connecting a second motor with full-field winding to the supply circuit.

10. The method of operating a plurality of electric motors severally having subdivided field windings from a supply circuit which consists in initially accelerating the motors to full series relation, temporarily excluding portions of the motor-field windings from circuit, directly connecting one motor with full-field winding to the supply circuit, and subsequently connecting a second motor with full-field winding to the supply circuit.

11. The method of transition of a plurality of motors from series to parallel-circuit relation when operated from a supply circuit which consists in accelerating the motors to full series relation, decreasing the active portions of the field windings of the motors, directly connecting one of the motors with full-field winding across the supply circuit, and then connecting a second motor with full-field winding to the supply circuit.

12. The method of operating an electric motor in conjunction with an auxiliary motor-generator set which consists in connecting the armature of one of the machines of said set in parallel relation to said motor, varying the field excitation of the machines of said set to independently vary the voltages of the respective machines from zero to a predetermined value, and subsequently connecting said motor across both armatures of the motor-generator set, while increasing the motor field strength.

13. In a system of control, the combination with a supply circuit and a plurality of electric motors having field windings, of means for effecting acceleration of said motors to full series relation, means for decreasing the exciting effect of said field windings to increase the motor speed, means for directly connecting one motor with full-field excitation to the supply circuit, and means for subsequently connecting a second motor with full-field excitation to the supply circuit to complete the parallel relation of the motors.

14. The method of operating a plurality of electric motors having field-varying means from a supply circuit which consists in initially accelerating the motors to full-series relation, temporarily weakening the field excitation, directly connecting one motor, with materially increased field excitation, to the supply circuit, and subsequently connecting a second motor, with materially increased field excitation, to the supply circuit.

In testimony whereof, I have hereunto subscribed my name this 12th day of June 1915.

RUDOLF E. HELLMUND.